P. GIOVANNINI & B. BENNERSCHEIDT.
Water-Gate.
No. 209,882. Patented Nov. 12, 1878.
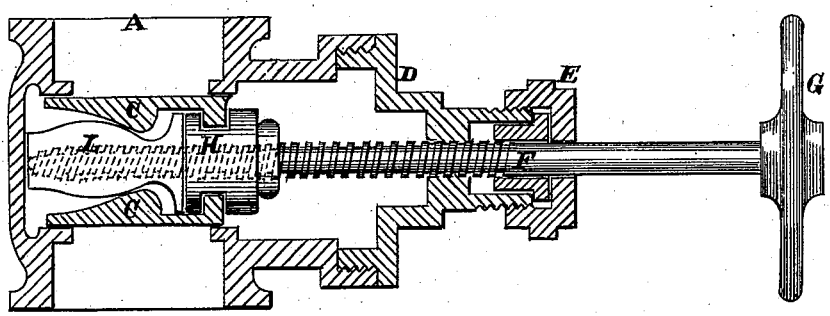
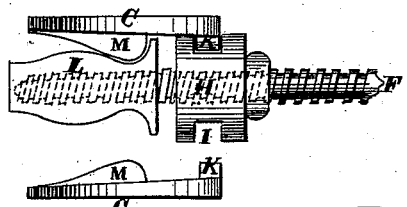
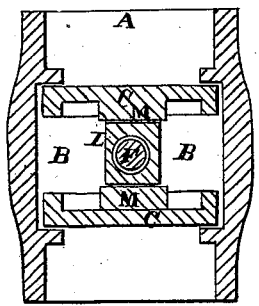
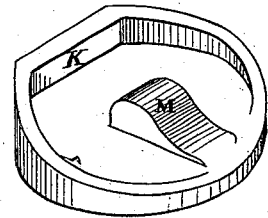
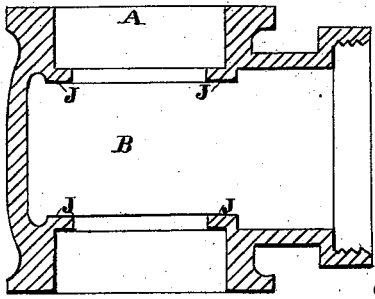
Witnesses
Geo. H. Strong
S. M. Pool
Inventors
P. Giovannini
B. Bennerscheidt
per Dewey & Co.

UNITED STATES PATENT OFFICE.

PHILIP GIOVANNINI AND BRUNO BENNERSCHEIDT, OF SAN FRANCISCO, CAL.

IMPROVEMENT IN WATER-GATES.

Specification forming part of Letters Patent No. 209,882, dated November 12, 1878; application filed September 23, 1878.

*To all whom it may concern:*

Be it known that we, PHILIP GIOVANNINI and BRUNO BENNERSCHEIDT, of the city and county of San Francisco, and State of California, have invented an Improved Water-Gate; and we do hereby declare the following to be a full, clear, and exact description thereof, reference being had to the accompanying drawings.

Our invention relates to certain improvements in that class of stop-valves technically known as "water-gates;" and it consists in certain details of construction, as hereinafter fully described and claimed.

These disks are moved forward and backward by means of a screw, which operates through a nut, having a channel or groove in its periphery to take hold of the disks. The inner faces of the disks have each a peculiarly-shaped lug, and a similarly-shaped loose block between them serves to force the disks out of their bearings just as they reach a point opposite to their bearings, and when the loose block strikes the bottom, thereby closing the passage effectually. When the gate is to be opened, the first movement of this block releases the disks from their bearings, so that they will move easily.

Referring to the accompanying drawings for a more complete explanation of our invention, Figure 1 is a longitudinal section of our gate and apparatus. Fig. 2 is a transverse section through the gate. Fig. 3 is a view of one of the disks. Fig. 4 is a view of the operating parts separate. Fig. 5 shows the tube separate.

A is the pipe or tube in which it is desired to form the gate or valve. At the point where the gate is to work a chamber, B, is formed with parallel sides sufficiently wide apart to receive the diameter of the disks C C, as shown in the transverse section. An opening is made in line with this chamber and at right angles with the pipe, into which the cover or head D screws, this cover being provided with a stuffing-box, E, through which the screw-stem F passes, and is operated by a suitable hand-wheel or lever, G, at the outer end.

Within the chamber B is a cylindrical nut or block, H, having an annular groove, I, in its periphery, as shown. The screw-stem F has a thread of sharp pitch, and it passes through the block or nut H.

The disks C have one side faced off, and these faces fit against corresponding faces J within the chamber B and surrounding the pipe A where it enters this chamber from each side. Against these faces the disks C are forced, so as to form a tight joint or gate after they have been lowered to a point opposite the pipe, as will be hereinafter described.

In order to move the disks into and out of the pipe, they are provided at the top with flanges K, which project inwardly and fit into the annular groove I in the nut H, and when the screw F is turned, so as to withdraw the nut or force it forward, the disks are moved with it. During these movements the disks are held loosely within the chamber B and do not fit closely against the faces J; but in order to force them out to a bearing and make them fit after they are moved into the chamber opposite to the pipe we employ a peculiar-shaped block, L, which lies within the chamber B and between the disks.

Each disk has upon its back a peculiar curved lug, M, which fits into a corresponding depression in the side of the block, as shown. This block L rises and falls with the disks as they are moved by the screw-stem, but does not press them outwardly until they have reached a point directly opposite the pipe. A further turn of the screw forces it against the bottom and causes this block to act as a wedge against the lugs M, and it forces the disks to a bearing, so that all passage of water is effectually cut off from either direction, and this allows a pipe to be examined upon either side of the gate, as the pressure is resisted from both directions. The first turn-back of the screw F causes the block to loosen and release the disks, so that there will be no friction against the sides of the chamber, and they can then easily be withdrawn, so as to leave a free passage for the water.

This gate is very efficient in pipes of all sizes and under any pressure, and from its double form and perfect joint formation it is especially valuable for use in large water or steam pipes.

Having thus described our invention, what we claimas new, and desire to secure by Letters Patent, is—

1. The pipe A, with its chamber B, provided with the faces J, in combination with the disks or gates C, moving loosely across the passage and forced to a bearing after they reach the proper point by means of the cam-block L, surrounding the end of the valve-rod, and raised by the valves and screw, substantially as herein described.

2. The combination of the disks or gates C, provided with the flanges K K, fitted to be moved across the water-pipe A by means of the screw-stem F and nut H, said disks having the lugs M and operated by the cam-block L, surrounding the end of the valve-rod, and raised by the valves and screw, substantially as and for the purpose herein described.

In witness whereof we have hereunto set our hands.

PH. GIOVANNINI.
BRUNO BENNERSCHEIDT.

Witnesses:
GEO. H. STRONG,
FRANK A. BROOKS.